Figure 1:
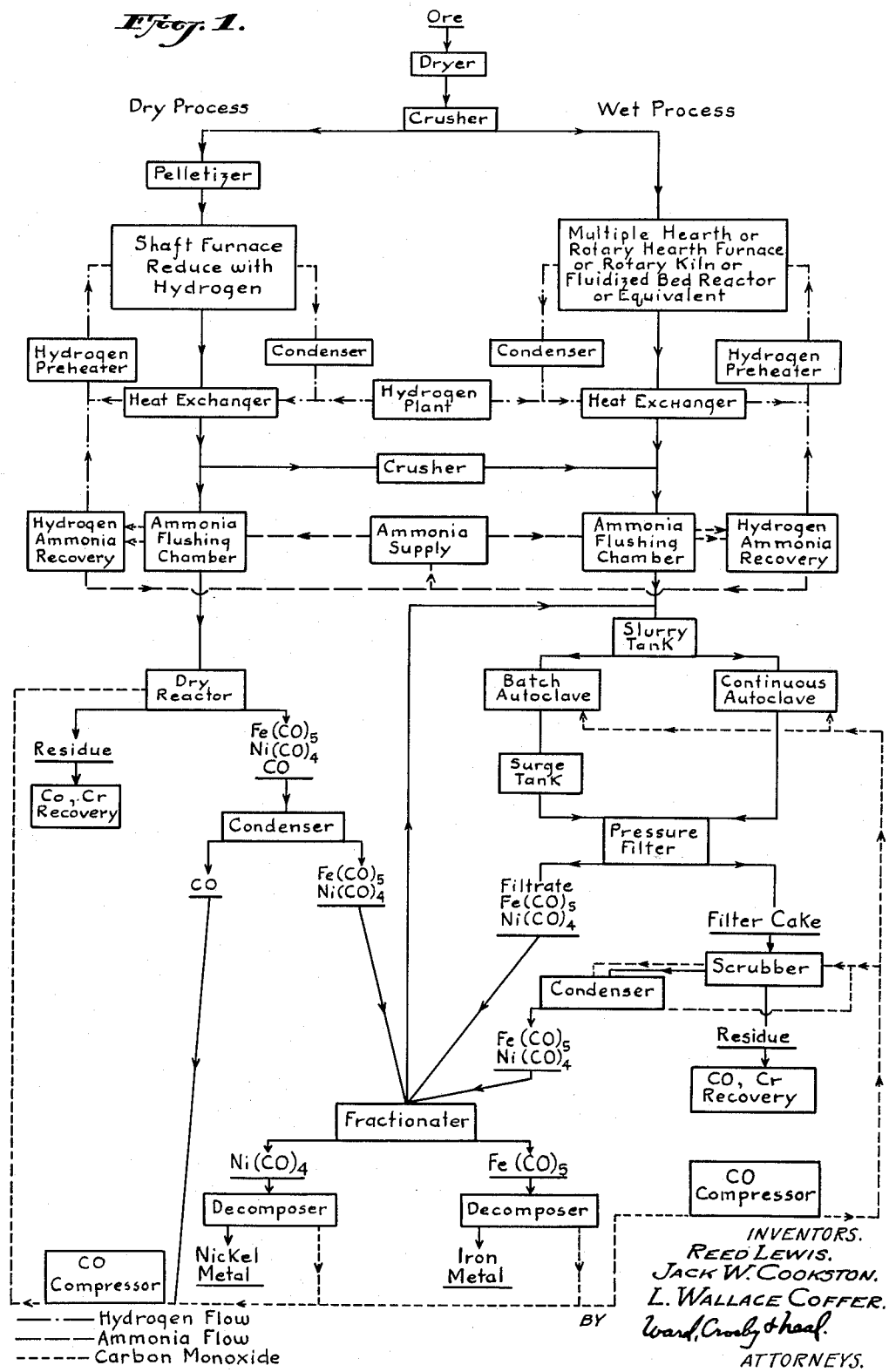

INVENTORS.
REED LEWIS.
JACK W. COOKSTON.
L. WALLACE COFFER.

INVENTORS.
REED LEWIS.
JACK W. COOKSTON.
BY L. WALLACE COFFER.

ATTORNEYS.

United States Patent Office 2,757,077
Patented July 31, 1956

2,757,077

METHOD OF RECOVERING METALLIC VALUES FROM ORES CONTAINING IRON AND NICKEL

Reed Lewis, Pittsburgh, Pa., and Jack W. Cookston and L. Wallace Coffer, Columbus, Ohio, assignors, by direct and mesne assignments, to Crucible Steel Company of America, Pittsburgh, Pa., a corporation of New Jersey Application June 12, 1953, Serial No. 361,358

22 Claims. (Cl. 75—.5)

This invention relates to processes for treating iron ore to recover metal values therefrom and more particularly to the treatment of nickel-bearing lateritic iron ores to recover and separate the various metal values thereof.

Various processes have been heretofore proposed for recovery of values from iron ores, particularly in the case of nickeliferous lateritic ores containing about 5% of nickel or less, together in general with small amounts of chromium and cobalt. Simultaneous production of iron and nickel carbonyls, from such ore, with removal of the carbonyls from the other ore constituents, has been proposed but it has been found that where the conditions were proper for the production of nickel carbonyl, substantially no iron carbonyl was formed and vice versa. Thus substantial yields of each of the substances, iron carbonyl and nickel carbonyl, simultaneously have not heretofore been obtained, so far as we are aware. Consequently, those working with the problem concluded that it was best to form only the nickel carbonyl or the iron carbonyl. Thus, in the Patent 2,378,053, Wallis et al., it is stated:

"However, it is recognized by those skilled in the art that the reaction between carbon monoxide and reduced iron involves factors entirely different to those affecting the kinetics of the reaction between reduced nickel and carbon monoxide or carbon monoxide containing gases. This is clearly stated by the patentees Mittash, Schlect, and Gaus in the U. S. Patent No. 1,812,399 at page 1, lines 5 to 11 in the following words: 'When trying to produce iron carbonyl by the action of carbon monoxide on iron by methods by which nickel carbonyl is produced on a commercial scale, either no iron carbonyl at all is obtained or the process proceeds in such a sluggish manner that the process cannot be carried out on a commercial scale'."

The principal object of the present invention is to overcome the disadvantages of the prior processes and to provide simple, efficient processes for production from such ores, of carbonyls and preferably the simultaneous production of iron and nickel carbonyls in high yields therefrom with a separation of the carbonyls and recovery of the metals therefrom, and also, if desired, recovery and separation of any cobalt values present.

The invention accordingly comprises the novel processes and steps of processes, specific embodiments of which are described hereinafter by way of example and in accordance with which we prefer to practice the invention.

We have found in accordance with the basic principles of our invention, that ores containing both iron and nickel, such as nickeliferous lateritic ores of the character aforesaid, may be reduced with an appropriate reducing agent, preferably hydrogen, at temperatures preferably upwards of 700° to about 850° C., when maintained at such temperature for about 1 to 3 hours. In nickeliferous iron ores, metallic iron and nickel are produced. The reduced ore is then treated with carbon monoxide containing, or in the presence of, from a trace to about 10%, and preferably about 0.02 to 3%, by weight of ammonia, at about 90°–130° C. and at pressures upwards of about 20 atmospheres, preferably about 20 to 30 atmospheres absolute pressure. Iron carbonyl is thus formed, as well as nickel carbonyl, where nickel is present. The liquid carbonyls formed are filtered off and otherwise separated, preferably by leaching with carbon monoxide, from the remaining treated ore. When nickel carbonyl and iron carbonyl are simultaneously produced and recovered, they are separated in accordance with our invention by fractionally distilling, preferably under vacuum, the mixture of iron and nickel carbonyls. The nickel carbonyl is driven off and condensed. The nickel carbonyl and iron carbonyl are then separately decomposed to form, respectively, metallic nickel and iron. Such nickel may contain some iron and in order to free it therefrom, the nickel carbonyl may be redistilled and then decomposed at an elevated temperature to obtain substantially pure nickel. The iron carbonyl may also be redistilled and then decomposed at an elevated temperature.

Figure 2:
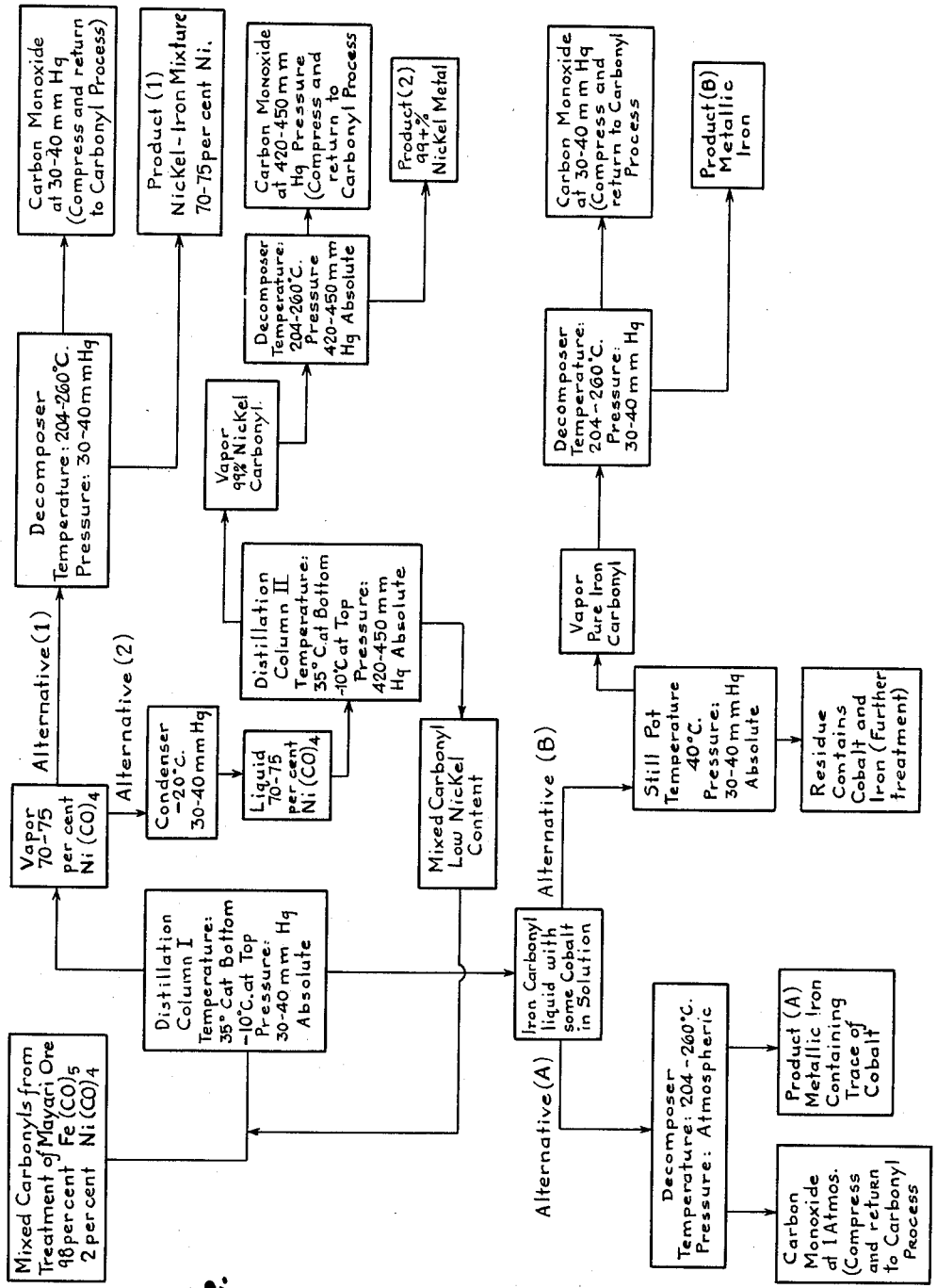

In the accompanying drawings, Fig. 1 is a flow sheet showing on the left therein a process which we call the "Dry Process" and on the right, a process which we call the "Wet Process," for carrying out the process in accordance with our invention. This flow sheet shows generally the steps of fractionating the nickel and iron carbonyls to separate them and decompose them; and Fig. 2 shows a flow sheet of more detailed steps of the separation of nickel and iron carbonyls.

Referring now to Fig. 1, we employ ore containing iron and nickel which is dried, if necessary, and crushed. Typical ores of this type ordinarily contain about 35–55% iron and about 0.5–5% nickel, together in general with small amounts of cobalt and/or chromium. Typical ores are as follows:

TABLE I

[Assay, Percent [1]]

| Ore | Fe | Ni | Cr | Co | SiO$_2$ | Al$_2$O$_3$ | MgO | CaO | H$_2$O | Loss on Ignition |
|---|---|---|---|---|---|---|---|---|---|---|
| 1 (Nicaro) [2] | 42.1 | 1.39 | 1.96 | 0.076 | 13.3 | 3.67 | | | 4.2 | 14.4 |
| 2 (Mayari) | 43.4 | 0.73 | 1.70 | 0.11 | 6.43 | 10.1 | 2.31 | 4.04 | 15.0 | 11.7 |
| 3 (Mayari) | 49.6 | 0.36 | 1.93 | 0.03 | 7.9 | | | | 1.6 | 9.5 |
| 4 (Mayari) | 51.6 | 1.13 | 2.42 | 0.19 | 3.95 | 5.54 | 1.04 | | | |
| 5 (Mayari) | 38.5 | 0.66 | 1.68 | 0.07 | 8.44 | 14.48 | 1.64 | | | |

[1] All assays are on a dry basis.
[2] 0.12 percent P$_2$O$_5$.

After crushing, the ore is alternatively passed through the dry or wet process, as follows:

*Dry process*

The crushed ore is passed to a pelletizer and is formed in pellets, for example, of minus ½, plus ¼ inch. It is then passed to an ordinary shaft furnace where it is reduced, preferably with hydrogen, at upwards of about 700° to about 850° C. for about 1 to 3 hours to produce metallic iron and metallic nickel. Cobalt where present is similarly reduced. The hydrogen is preferably circulated from a hydrogen plant through a heat exchanger, then through a hydrogen preheater to the shaft furnace. Moisture resulting from the reduction is condensed and excess hydrogen, after purification, if necessary, is then passed back into the hydrogen circuit.

The heat exchanger receives heat from the reduced ore passing therethrough, thus cooling the ore in a hydrogen atmosphere to the temperature required for carbonyl formation, while at the same time heating the hydrogen in the circuit.

Ammonia is supplied from the ammonia supply source to the ammonia flushing-chamber, into which the reduced ore passes, where the ore is provided with from a trace to about 10%, and preferably about 0.02 to 3%, by weight of anhydrous ammonia. The reduced ore combined with ammonia is then passed to the dry reactor. Excess ammonia and hydrogen pass from the ammonia flushing-chamber to an ammonia recovery system from which the ammonia is returned to the ammonia supply source, and hydrogen passing off and into the hydrogen pre-heater.

Carbon monoxide under a pressure upwards of about 20 atmospheres, and preferably at about 20 to about 30 atmospheres absolute, is supplied to the dry reactor containing the reduced ore. The reaction with carbon monoxide is conducted at about 90° to about 130° C. for up to about 16 hours, preferably about 4 to 16 hours, to produce iron carbonyl —$Fe(CO)_5$— and nickel carbonyl —$Ni(CO)_4$. After the reaction is complete, about 75% of the carbonyls may be drained from the reactor as liquids. The remainder may be removed from the residue, preferably with carbon monoxide, and passed to a condenser and there condensed to form the liquid carbonyls, the carbon monoxide passing back to the carbon monoxide compressor.

The liquid nickel carbonyl and iron carbonyl are then passed to a fractionator in which they are separated and are then decomposed to form, respectively, nickel metal and iron metal, carbon monoxide passing off and into the carbon monoxide compressor. The detailed procedures for fractionating a mixture of iron and nickel carbonyls are given in Fig. 2 below:

Wet process

In the wet process a slurry is made of the ore after reduction with hydrogen by mixing it with iron carbonyl or a mixture of iron carbonyl and nickel carbonyl, preferably previously obtained by the process, and this slurry is then treated in an autoclave with carbon monoxide under pressure. Details of this are as follows:

Going back to the start of the wet process, the crushed ore is passed into either a multiple hearth furnace, a rotary hearth furnace, a rotary kiln, a fluidized-bed reactor, or other suitable reduction equipment. Hydrogen from the hydrogen plant passes through a heat exchanger and through a hydrogen pre-heater into one or the other of the furnaces or rotary kiln equipment or into the fluidized-bed reactor or equivalent. The iron and nickel are reduced by hydrogen at upwards of about 700°–850° C. for about 1 to 3 hours, to metallic iron and nickel and as so reduced pass through the heat exchanger to cool the reduced ore to the temperature of carbonyl formation and to heat up the hydrogen passing from the hydrogen plant.

The reduced ore passes to the ammonia flushing-chamber which is supplied with ammonia from the ammonia supply source in the proportions aforesaid, and then to the slurry tank described below. Excess ammonia and hydrogen pass to a hydrogen-ammonia recovery unit from which the recovered ammonia passes back to the ammonia supply and the hydrogen passes to the pre-heater.

Instead of using furnace equipment of the character aforesaid, we may use the shaft furnace for reduction to supply material to the slurry tank but in that case a crusher is placed in the line to receive the pellets from the shaft furnace which are then crushed to the desired size and pass through the ammonia flushing-chamber to the slurry tank.

The reduced ore containing the anhydrous ammonia is mixed in the slurry tank with sufficient iron carbonyl or a mixture of iron and nickel carbonyls to make a slurry suitable for pumping and agitation. The carbonyls to be used for making the slurry are preferably in the proportions received at the fractionator of the wet process. After the slurry is formed, the slurry may be passed either to a continuous autoclave or a batch autoclave, in either of which it is maintained in contact with carbon monoxide supplied from the carbon monoxide compressor, for at least 4 hours at about 90° to 130° C. under pressure of at least 20 atmospheres, and preferably about 20 to 30 atmospheres absolute. If a batch autoclave is used, the material produced by the batch process passes to a surge tank and then to a pressure filter from which the filtrate of iron and nickel carbonyls passes to the fractionator. If the continuous autoclave is employed, its product passes directly to the pressure filter and the filtrate passes to the fractionator. The filter cake passes to a scrubber from which iron and nickel carbonyls are scrubbed out by carbon monoxide or equivalent means, and the products pass to a condenser from which the condensed carbonyls are passed to the fractionator. Excess carbon monoxide from the condenser passes back again to the scrubber. The residue from the scrubber containing any cobalt and chromium is treated for recovery of these materials as explained below.

Iron carbonyl and nickel carbonyl separation

Referring now to Fig. 2, the treatment of a typical mixture of iron and nickel carbonyl obtained from a treatment of Mayari ore containing 98% $Fe(Co)_5$ and 2% $Ni(CO)_4$ is shown. In this flow sheet are shown steps to obtain, with regard to nickel, either a nickel-iron mixture of 70–75% nickel, or alternatively, a nickel metal containing 99%+ nickel, and with respect to iron, either a metallic iron containing a trace of cobalt, or alternatively, substantially pure metallic iron free from cobalt, but which may contain some carbon, ordinarily not more than about 2% C.

Thus the mixed carbonyls may be first passed to a distillation column I having a temperature of about 35° C. at the bottom and —10° C. at the top under a pressure of 30–40 mm. Hg absolute pressure. Nickel carbonyl distills from the top of the column and iron carbonyl is taken off from the bottom. The iron carbonyl contains some cobalt in solution.

Nickel separation

The nickel carbonyl vapor containing 70–75% nickel carbonyl in order to produce a product comprising a nickel-iron mixture as mentioned above, may be decomposed, for example, at 204–260° C. under a pressure of 30–44 mm. Hg to produce the said nickel-iron mixture. Other conditions of temperature and pressure may be employed. Carbon monoxide given off may be compressed and returned to the CO compressor shown in Fig. 1.

Alternatively, the vapor from distillation column I may be condensed at —20° C. at 30 to 40 mm. Hg. The liquid containing 70–75% of nickel carbonyl is then passed to distillation column II. The temperature at the bottom thereof is maintained at about 35° C., and at the top, at about —10° C., under a pressure of about 420–450 mm. Hg absoulte pressure. The vapor passing from this column contains 99% nickel carbonyl and may be decomposed at a temperature of 204–260° C. under a pressure of 420–450 mm. Hg absolute to produce product 2, being 99%+ nickel metal. Other temperature and pressure conditions may be used. The carbon monoxide may be returned to the CO compressor of Fig. 1.

The mixed carbonyls having a low nickel content passing from the bottom of distillation column II may be returned to distillation column I for further treatment.

Iron and cobalt separation

To obtain an iron containing some cobalt, the iron carbonyl passing from the bottom of column I is decomposed at 204–260° C. under atmospheric pressure to obtain an iron containing a trace of cobalt, the CO being returned to the carbon monoxide compressor of Fig. 1. Other temperature and pressure conditions may be used.

Alternatively, the impure iron carbonyl from the base of distillation column I is passed to a still pot having a temperature of about 40° C. and pressure of about 30–40 atmospheres absolute. The vapors passing off are decomposed at a temperature of 204–260° C. under a pressure of 30–40 mm. Hg to give a substantially pure metallic iron, carbon monoxide being returned to the carbon monoxide compressor. Other temperature and pressure conditions may be used.

The residue from the bottom of the still pot contains cobalt and iron and may be given further treatment to recover same as explained below.

With reference to the processes above described, the temperature at which the reduction is carried out is rather critical as shown by the test results in the following Table II, which gives for various temperatures of reduction, for the lateritic nickeliferous ore 1 of Table I, the percent conversion to carbonyls, of the iron and nickel contents thereof. In carrying out the tests of Table II, the ore 1 was pelletized to minus-½-plus-¼-inch pellets, which were subjected to hydrogen reduction for 2 hours at the temperatures indicated in the table and covering the range of 650–900° C., following which the reduced ore pellets were treated for 16 hours at a temperature of 100° C. and under a pressure of 375 p. s. i. gauge, i. e., 26 atmospheres, with carbon monoxide containing an ammonia concentration of 0.3–2%.

TABLE II

| Reduction Temperature, C | Percent Conversion to Carbonyl | |
|---|---|---|
| | Iron | Nickel |
| 650 | 65.2 | 78.6 |
| 700 | 77.1 | 88.0 |
| 750 | 76.2 | 89.8 |
| 800 | 82.2 | 91.8 |
| 850 | 73.3 | 84.8 |
| 900 | 63.7 | 69.9 |

These data show that, for a treatment time of 2 hours, superior results are obtained in the carbonyl step when the initial reduction is carried out within the temperature range of 700–850° C. and preferably within the range of about 700–800° C. When the reduction is carried out outside of this temperature range, inferior conversions and lower yields are obtained in the subsequent carbon monoxide treatment. At temperatures below 700° C. incomplete reduction occurs and at temperatures above 850° C. some further reaction occurs that has an adverse effect on carbonly formation. Consistent conversions of 80–85% of the iron, and 90–92% of the nickel, are obtained when the reduction step is carried out at about 800° C.

Where hydrogen is employed as the reducing agent, approximately 2–10 times, and preferably about 10 times, the stoichiometric quantity of hydrogen needed for the reduction of the iron and nickel, must be employed regardless of the temperature or time of reduction, in order to produce the maximum yield of iron and nickel carbonyls.

It is also preferable to cool the reduced ore from the reduction temperature to that of the carbon monoxide treatment in a hydrogen atmosphere. Other cooling gases would need to be of very high purity, as the reduced metals in the ore are highly reactive, and even traces of oxygen will cause surface oxidation which renders the reduced metals less reactive to the carbon monoxide treatment.

As stated, hydrogen is the preferred reducing agent, because the reduced ore may be cooled to the temperature of carbonyl formation more advantageously than if other reducing agents are employed. If, for example, the reduction is carried out with water gas, comprising principally a mixture of carbon monoxide and hydrogen, or with producer gas, comprising principally a mixture of carbon monoxide and nitrogen, the carbon monoxide present in the gas decomposes in greater or lesser degree during cooling from the reducing temperature range to that of carbonyl formation, into carbon and carbon dioxide, with resulting formation of carbides and oxides of the reduced metals.

Thus with carbon monoxide containing reducing agents, in order to prevent these effects, the furnace in which the ore reduction is effected, must be flushed out with a high purity inert gas, such as argon, helium, etc., or with hydrogen, before dropping the furnace temperature to that of carbonyl formation. On the other hand, where pure hydrogen is employed for the reduction, it is required only to cool the reduced ore down in the hydrogen atmosphere and, prior to carbonyl formation, to flush out the hydrogen with ammonia or with carbon monoxide containing an appreciable ammonia content of, for example, 0.3–10%. The ammonia serves the function, among other possible effects, of flushing hydrogen from the surfaces of the particles of the reduced metal, thus rendering these surfaces more reactive to the carbon monoxide for producing carbonyls in highest yields.

A lapse of time between the reduction step and the step of carbon monoxide treatment is detrimental to carbonyl formation. We have found that the reduced ore when stored even in such inert atmospheres as hydrogen, high purity nitrogen or ammonia, loses its reactivity. In a 24-hour storage period, the reactivity has been found to decrease to such an extent that the conversions of iron and nickel to their carbonyls are only about 30 and 40%, respectively, instead of the 80 and 90% yields obtained when the reduced ore is treated immediately after reduction.

In the carbon monoxide treatment of a properly reduced ore, temperature, carbon monoxide pressure, ammonia addition and time of treatment are the controlling conditions involved. As regards pressure, that of about 375 p. s. i. gauge, i. e., 26 atmospheres, was found to be about the lowest pressure at which good conversions could be obtained. With high pressures, equally good yields could be obtained in a shorter time, but from the standpoint of economy, the above pressure of about 26 atmospheres was found to be most acceptable. The experimental work has shown that the rate and completeness of the carbonyl formation reactions are almost direct functions of the pressure employed.

As regards temperature for carbonyl formation, a temperature of 100° C. has been found to be about the optimum for the formation of iron and nickel carbonyls at a pressure of 375 p. s. i. gauge, as shown by the test results in the following Table III in which the carbonyl conversion was carried out with carbon monoxide of substantially 100% purity and also with a mixture thereof containing about 7.5% ammonia.

TABLE III

| Temperature, C. | Percent Conversion to Carbonyl | | | |
|---|---|---|---|---|
| | 100% CO | | 7.5% NH₃ | |
| | Fe | Ni | Fe | Ni |
| 80 | | | 40.9 | 62.8 |
| 90 | 67.2 | 65.2 | 66.0 | 80.0 |
| 100 | 67.2 | 72.3 | 80.0 | 81.9 |
| 110 | 60.5 | 62.4 | 75.7 | 84.0 |
| 125 | 0.0 | 0.0 | | |

It will be seen from the above data that the maximum yields are obtained at a treatment temperature of about 100° C. Also as shown by these data, the effect of the presence of the ammonia is very striking, resulting in increases in yield both of iron and nickel carbonyls at substantially all temperatures investigated amounting for the optimum treatment at 100° C. to an increase of about 13% for the iron carbonyl and about 10% for the nickel carbonyl. The foregoing data are for a specific ammonia concentration. Changes in the ammonia concentration will result in different yields at the corresponding temperatures. In a large number of similar tests which have been run with other temperatures or ammonia concentrations, however, the average increase in conversions caused by the presence of the ammonia was found to be about 11% for both the iron and the nickel.

Our investigations have shown that carrying out the carbon monoxide treatment in the presence of ammonia, almost totally inhibits the reduction-oxidation reactions and slagging of the ore which occur when straight carbon monoxide is used and with no ammonia present. In our process we have found that flushing the ore with ammonia after the reduction step and prior to the carbon monoxide treatment step is the most effective method of employing ammonia. It is our belief that ammonia serves various purposes in the carbonyl formation. The ammonia inhibits the reaction $2CO \rightarrow C + CO_2$ and thereby prevents the formation of carbides and oxides of the metals. It also appears to catalyze both the iron and nickel carbonyl formation reactions. And additionally, as above stated, it removes absorbed hydrogen from the freshly reduced metal. The carbonyls formed during the carbon monoxide treatment appear to be stabilized by the presence of ammonia. Ammonia does not appear to combine with any of the components of the reactions, as analyses of the exhaust gases at the end of the carbon monoxide treatment show practically the same concentrations of ammonia as the calculated starting concentrations. As above stated, ammonia may be present from a trace to about 10%, although the most effective concentration range is about 0.02–5%.

The percent yield in iron and nickel carbonyl formation versus time of the carbon monoxide treatment is shown below in Table IV. These test results were based on treatment of ore 3 above by the wet treatment, in which the ore as crushed and screened to minus 65-mesh was reduced with hydrogen for 2 hours at 800° C. The reduced ore was then cooled in hydrogen, flushed with ammonia, and then slurried with a mixture of iron and nickel carbonyls. The slurry was then stirred in an autoclave under a carbon monoxide pressure of 375 p. s. i. gauge and at a temperature of about 110° C., for the time intervals indicated in the table for various samples. Following the reaction treatment in the autoclave, the contents were cooled to room temperature before the pressure was relieved. The slurry was then removed from the autoclave and filtered. The filter cake was washed free of carbonyls with ethyl alcohol, with the results as shown below in the table.

TABLE IV

| Treatment Time, Hours | Percent Conversion to Carbonyl | |
|---|---|---|
| | Iron | Nickel |
| 16 | 89.3 | 98.1 |
| 12 | 88.2 | 98.5 |
| 8 | 87.2 | 97.5 |
| 6 | 88.0 | 97.2 |
| 5 | 80.9 | 92.1 |
| 4 | 72.0 | 89.8 |
| 2 | 36.1 | 49.8 |

These values show that in the wet process, practically all of the conversion takes place within 6 hours. Of this time, 1½ hours were required to heat the autoclave to the reaction temperature. In the dry process, the reaction temperature is reached in about 15 minutes.

In the above Table I, it will be noted that ores 1 to 5 assay about 0.025–0.11% cobalt and about 1.45–1.96% chromium. Substantially all of these values remain in the residue from the dry process treatment, or, if the ore is treated by the wet process, they remain in the filter cakes.

When the filter cakes from a wet process treatment are washed with alcohol or other suitable solvents, the major portion of the cobalt, i. e., about 85%, is carried over into the alcohol-wash solution.

The major portion of the chromium value, i. e., about 70%, may be concentrated from the residue by means of a magnetic separator, the chromium being retained in the non-magnetic fraction.

Contrary to the many statements appearing in the literature as to the inhibiting effect of carbonyls on the formation of additional carbonyls, we have found, that with our process, the formation of iron and nickel carbonyls will occur to a satisfactory degree of completion and at a reasonably rapid rate in the presence of iron and nickel carbonyls. We have also found that the solubility of carbon monoxide in iron and/or nickel carbonyl allows for a concentration of carbon monoxide strong enough to carry out the carbonyl formation reactions, this with particular reference to the "wet" process above described. In this connection we have further found that the rate of diffusion of carbon monoxide through the carbonyls is rapid enough to carry on the formation reactions at a satisfactory rate, if the diffusion is assisted by agitation of the slurry. The presence of ammonia promotes the formation of carbonyls in the slurry treatment of the "wet" process just as effectively as it does in the "dry" process.

What is claimed is:

1. A process, which comprises, reducing iron ore at about 700° to about 850° C. for about 1 to 3 hours to produce metallic iron and treating the reduced ore with carbon monoxide in the presence of from about 0.02 to 10% by weight of ammonia, at about 90 to 130° C. under about 20 to about 30 atmospheres absolute pressure thereby converting the iron to iron carbonyl.

2. A process according to claim 1 wherein the reducing agent is hydrogen.

3. A process, which comprises, subjecting ore containing both iron and nickel, to reduction at about 700° to about 850° C. for about 1 to 3 hours to produce metallic iron and nickel, and treating the reduced ore after reduction with carbon monoxide in the presence of from about 0.02 to 10% by weight of ammonia at about 90° to 130° C. under about 20 to about 30 atmospheres absolute pressure, and thereby converting the iron and nickel respectively to iron carbonyl and nickel carbonyl.

4. A process according to claim 3 wherein the ore is reduced with hydrogen.

5. A process in accordance with claim 3 which includes the additional steps of removing the iron carbonyl and nickel carbonyl from the remainder of the ore and separating said carbonyls by fractional distillation.

6. A process in accordance with claim 3 which includes the additional steps of removing the iron carbonyl and nickel carbonyl from the remainder of the ore, separating said iron and nickel carbonyls, and decomposing them, respectively, to form separated values of metallic iron and nickel.

7. A process in accordance with claim 5 in which the nickel carbonyl is separated from the iron carbonyl by fractional distillation under vacuum, removing the nickel carbonyl as a vapor, condensing same, and decomposing the iron and nickel carbonyls to form metallic iron and nickel.

8. A process according to claim 5, which includes the additional steps of redistilling said iron and nickel carbonyls after separating, and decomposing said redistilled carbonyls, thereby to produce substantially pure metallic iron and nickel, respectively.

9. A process which comprises forming pellets of ore containing iron and nickel, said ore containing from about 30 to 55% iron and about .05 to 5% nickel, reducing the iron and nickel compounds to metallic iron and nickel at about 700° to about 850° C. for about 1 to 3 hours, treating the reduced pellets immediately after reduction with carbon monoxide in the presence of from about 0.02 to 10% by weight of anhydrous ammonia, at about 90° to about 130° C., under about 20 to about 30 atmospheres absolute pressure for at least 4 hours, thereby converting the iron and nickel, respectively, to iron carbonyl and nickel carbonyl, separating the iron and nickel carbonyls from the remainder of the ore, fractionally distilling the iron and nickel carbonyls under vacuum to drive off nickel carbonyl, condensing and redistilling the nickel carbonyl and decomposing it about 204–260° C. under pressure of about 420–450 mm. Hg to obtain substantially pure nickel, distilling the iron carbonyl at about 40° C. with a pressure of about 30–40 mm. Hg, and decomposing the iron carbonyl vapors at a temperature of about 204–260° C., and at a pressure of about 30–40 mm. Hg to produce substantially pure metallic iron.

10. A process according to claim 9 wherein hydrogen is employed for reducing the iron and nickel compounds, and wherein following said reduction, the reduced ore is cooled down in a hydrogen atmosphere substantially to room temperature, and the hydrogen flushed therefrom with ammonia, prior to treating with carbon monoxide.

11. A process which comprises reducing a nickeliferous iron ore with hydrogen at about 700° to about 850° C. for 1 to 3 hours, adding in liquid phase at least one carbonyl selected from the group consisting of iron carbonyl and nickel carbonyl, to form a slurry, thereupon treating the slurry with carbon monoxide in the presence of from about 0.02 to 10% by weight of anhydrous ammonia at a temperature of about 90° to about 130° C. at about 20 to about 30 atmospheres absolute pressure to convert the reduced iron and nickel to the corresponding carbonyls, and separating the iron and nickel carbonyls from the remainder of the so-treated slurry.

12. A process in accordance with claim 11 which includes the additional step of fractionally distilling the carbonyls to separate them from one another.

13. A process in accordance with claim 11 which includes the additional steps of fractionally distilling the iron carbonyl and nickel carbonyl under reduced pressure to separate them from one another and then decomposing the iron and nickel carbonyls to form respectively metallic iron and nickel.

14. A process which comprises the steps of forming a lateritic nickeliferous iron ore into pellets and reducing the ore in such form with hydrogen at about 700° to about 850° C. for 1 to 3 hours.

15. A process in accordance with claim 14 in which the pellets are about minus-½-inch-plus-¼-inch and the ore contains 30 to 55% iron and .05 to 5% nickel.

16. A process which comprises the steps of treating a reduced nickeliferous iron ore containing metallic iron and metallic nickel, with carbon monoxide in the presence of from about 0.02 to 10% by weight of ammonia at a temperature of about 90° to about 130° C. at about 20 to about 30 atmospheres absolute pressure, thereby converting the iron and nickel respectively to iron carbonyl and nickel carbonyl.

17. A process in accordance with claim 16 in which the reduced ore contains about 30 to about 55% iron and about .05 to about 5% nickel and is in the form of pellets of minus-½-inch-plus-¼-inch.

18. A process which comprises the steps of fractionally distilling a mixture of iron carbonyl and nickel carbonyl under vacuum, separating the iron carbonyl from the nickel carbonyl, condensing the nickel carbonyl and decomposing it at about 204–260° C. under reduced pressure and decomposing the iron carbonyl at about 204–260° C. under atmospheric pressure.

19. A process in accordance with claim 18 in which instead of decomposing the nickel carbonyl under the temperature and pressure indicated, it is first condensed, redistilled and the distillate decomposed at 420–450 mm. Hg pressure and at a temperature of about 204–260° C.

20. A process in accordance with claim 18 in which instead of decomposing the iron carbonyl at the temperature and pressure indicated, it is first redistilled and the distilate decomposed at a temperature of about 204–260° C. and at about 30–40 mm. Hg pressure.

21. A process in accordance with claim 18 in which the mixture of carbonyls contains a trace of cobalt and in which the cobalt is removed with the iron and upon decomposition remains in the iron.

22. A process of recovering and isolating metal values from iron ores containing small amounts of nickel, cobalt and chromium, which comprises: reducing the ore at about 700° to 850° C. for about 1 to 3 hours, treating the reduced ore with carbon monoxide in the presence of about 0.02 to 10% by weight of anhydrous ammonia, at about 90° to 130° C. under about 20 to 30 atmospheres absolute pressure, thereby to form iron carbonyl and nickel carbonyl in liquid phase, separating said carbonyls from the reduced ore and fractionally distilling to drive off the nickel carbonyl, decomposing said carbonyls to form metallic iron and metallic nickel, leaching the reduced ore with a solvent to remove the cobalt therefrom and subjecting the residual ore to magnetic separation to concentrate the chromium.

References Cited in the file of this patent

UNITED STATES PATENTS

| 480,405 | Jones | Aug. 9, 1892 |
| 1,836,732 | Schlecht | Dec. 15, 1931 |
| 2,004,534 | Muller et al. | June 11, 1935 |
| 2,212,459 | Simpson | Aug. 20, 1940 |
| 2,378,053 | Wallis et al. | June 12, 1945 |
| 2,590,078 | Maeder | Mar. 25, 1952 |
| 2,612,440 | Altmann | Sept. 30, 1952 |

FOREIGN PATENTS

| 296,558 | Great Britain | Sept. 6, 1928 |

OTHER REFERENCES

Handbook of Chemistry and Physics, 26th edition, pages 368 and 369, published by the Chemical Rubber Co., 1942, Cleveland, Ohio.

"Carbon Monoxide Reactions," P. B. 6356, Fiat Final Report No. 499 (1945), page 1.